United States Patent
Mouffok

(10) Patent No.: US 11,671,916 B2
(45) Date of Patent: Jun. 6, 2023

(54) TRANSITIONING WIRELESS NODES BETWEEN REDUCED POWER STANBY STATES AND HIGHER POWER DETECTION STATES BASED ON A TRIGGERING EVENT

(71) Applicant: Schlumberger Technology Corporation, Sugar Land, TX (US)

(72) Inventor: Khaled Mouffok, Sugar Land, TX (US)

(73) Assignee: Schlumberder Technoloav Corporstion, Sugar Land, TX (US)

( * ) Notice: Subject to any disclaimer, the term of this patent is extended or adjusted under 35 U.S.C. 154(b) by 40 days.

(21) Appl. No.: 17/037,008

(22) Filed: Sep. 29, 2020

(65) Prior Publication Data

US 2022/0104130 A1   Mar. 31, 2022

(51) Int. Cl.
H04W 52/02    (2009.01)
E21B 47/14    (2006.01)
E21B 47/13    (2012.01)

(52) U.S. Cl.
CPC ......... *H04W 52/0232* (2013.01); *E21B 47/13* (2020.05); *E21B 47/14* (2013.01); *H04W 52/0212* (2013.01)

(58) Field of Classification Search
CPC ......... H04W 52/0232; H04W 52/0212; H04W 52/0229; H04W 52/0251; H04W 52/0287; E21B 47/13; E21B 47/14; Y02D 30/70; H04B 11/00; G01V 3/08; G01H 17/00
See application file for complete search history.

(56) References Cited

U.S. PATENT DOCUMENTS

| | | | |
|---|---|---|---|
| 2009/0149127 A1* | 6/2009 | Viitamaki | H04W 52/0216 455/574 |
| 2012/0106477 A1* | 5/2012 | Kwon | H04W 52/365 370/328 |
| 2014/0182845 A1 | 7/2014 | Roberson et al. | |
| 2016/0208605 A1 | 7/2016 | Morrow et al. | |
| 2018/0058205 A1 | 3/2018 | Clawson et al. | |
| 2018/0058208 A1 | 3/2018 | Song et al. | |
| 2019/0186259 A1 | 6/2019 | Clawson et al. | |

FOREIGN PATENT DOCUMENTS

WO    2018140844 A1    8/2018

OTHER PUBLICATIONS

Search Report and Examination of Norway Patent Application No. 20211164 dated Dec. 17, 2021_5 pages.
(Continued)

*Primary Examiner* — Md K Talukder
(74) *Attorney, Agent, or Firm* — Jeffrey D. Frantz

(57) ABSTRACT

An energy efficient protocol for a communication network made up of a network of wireless communication nodes is disclosed. To reduce the amount of energy consumed by the nodes, the nodes operate in a reduced power duty cycle acquisition mode of operation in which the nodes cycle between a low power standby state and a higher power detection state. The nodes are forced to transition out of the duty cycle acquisition mode in response to detection of a triggering event when in the detection state. The operating parameters of the reduced power duty cycle acquisition mode can be modified based on current operating conditions on the network.

15 Claims, 4 Drawing Sheets

(56) References Cited

OTHER PUBLICATIONS

Zhen, ChengFang et al., Energy-Efficient Sleep/Wake Scheduling for Acoustic Localization Wireless Sensor Network Node, Article 970524, International Journal of Distributed Sensor Networks, vol. 10, 2014, 14 pages.
Exam Report Under Section 18(3) issued in United Kingdom Patent Application No. GB2113938.1 dated Feb. 13, 2023, 5 pages.

* cited by examiner

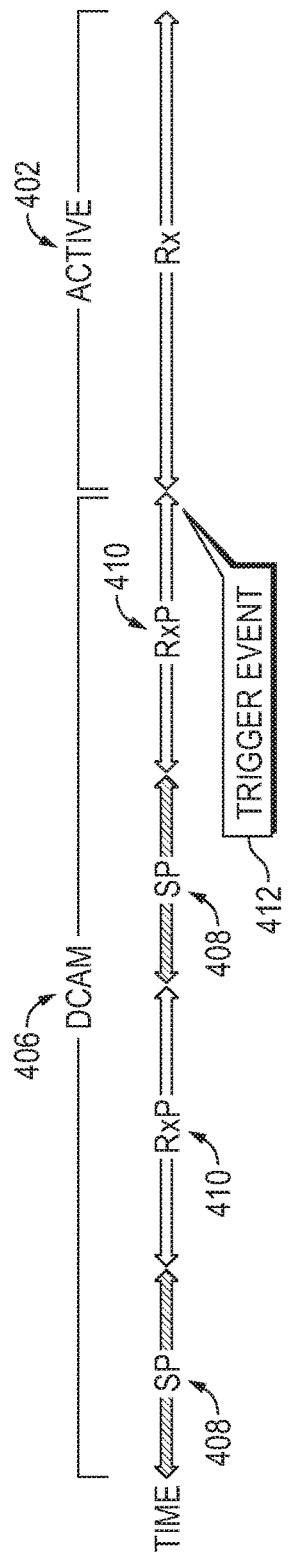
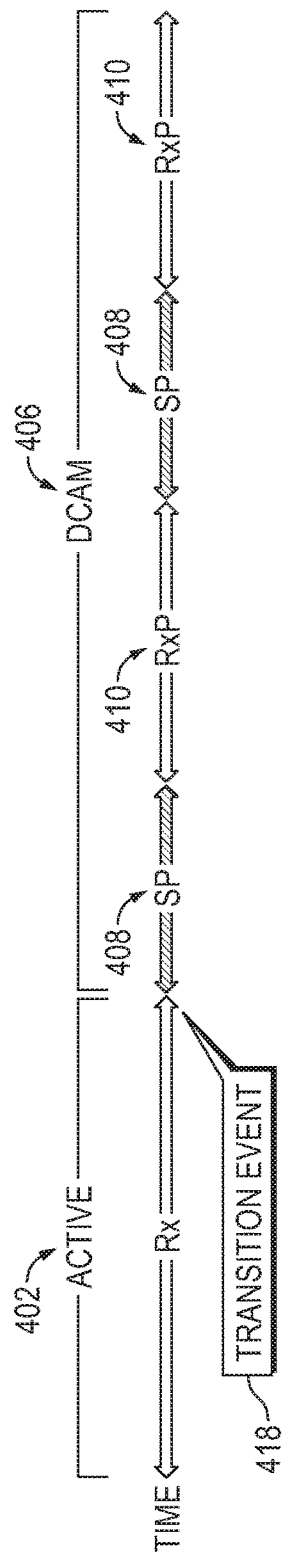
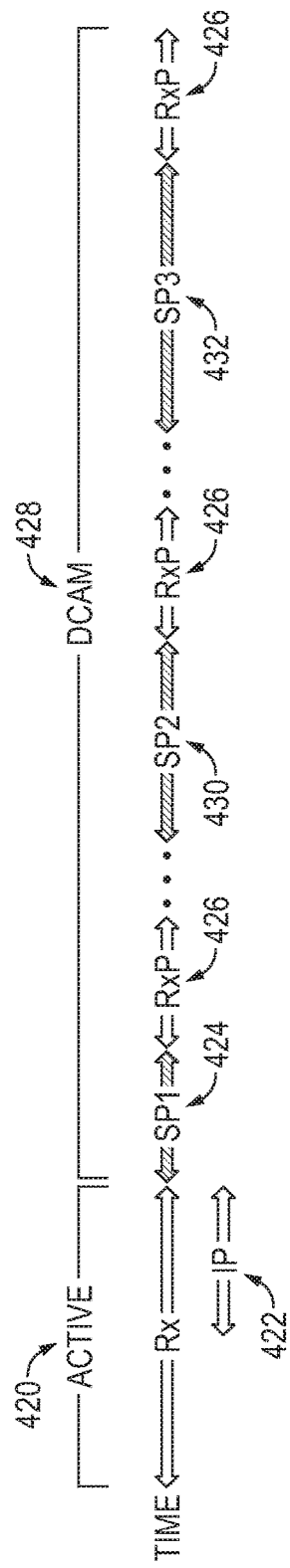
FIG. 5
FIG. 6
FIG. 7

TRANSITIONING WIRELESS NODES BETWEEN REDUCED POWER STANBY STATES AND HIGHER POWER DETECTION STATES BASED ON A TRIGGERING EVENT

BACKGROUND

Hydrocarbon fluids such as oil and natural gas are obtained from a subterranean geologic formation, referred to as a reservoir, by drilling a well that penetrates the hydrocarbon-bearing formation. Once a wellbore is drilled, various forms of well completion components may be installed in order to control and enhance the efficiency of producing the various fluids from the reservoir. Data representative of various downhole parameters, such as downhole pressure and temperature, are often monitored and communicated to the surface during operations before, during and after completion of the well, such as during drilling, perforating, fracturing and well testing operations. In addition, control information often is communicated from the surface to various downhole components to enable, control or modify the downhole operations.

Accurate and reliable communications between the surface and downhole components during operations can be difficult. Wired, or wireline, communication systems can be used in which electrical or optical signals are transmitted via a cable. However, the cable used to transmit the communications generally requires complex connections at pipe joints and to traverse certain downhole components, such as packers. In addition, the use of a wireline tool is an invasive technique which can interrupt productions or affect other operations being performed in the wellbore. Thus, wireless communication systems can be used to overcome these issues.

An example of a wireless system is an acoustic communication system. In acoustic systems, information or messages are exchanged between downhole components and surface systems using acoustic transmission mediums. As an example, a network of acoustic devices can be deployed downhole that uses tubing in the wellbore as the medium for transmitting information acoustically.

SUMMARY

Certain embodiments of the present disclosure are directed to a method for managing energy efficiency in a network of wireless communication nodes interconnected by a wireless communications medium. The wireless communication nodes are operable in at least an active mode for sending and receiving messages on the wireless communication medium and in a reduced power mode. The nodes include a wireless power source. In accordance with the method, the operation of at least one of the wireless communication nodes is transitioned into the reduced power mode, in which the wireless communication node cycles between a first time period and a second time period. Energy consumed from the wireless power source is less during the first time period than in the second time period. The wireless communication node is operable to detect a triggering event during the second time period but not the first time period. Operation of the wireless communication node is transitioned out of the reduced power mode in response to detection of the triggering event during the second time period.

Further embodiments of the present disclosure are directed to an acoustic communication system that includes acoustic communication nodes arranged in a network in which the acoustic communication nodes are interconnected via a plurality of acoustic communication links. The acoustic communication nodes include a wireless power source from which the node receives power. In response to occurrence of a predefined event, an acoustic communication node transitions to a reduced power mode of operation in which the acoustic communication node cycles between a standby state and a detection state. The acoustic communication node consumes less power from the wireless power source in the standby state than in the detection state. When in the detection state but not in the standby state, the acoustic communication node is operable to detect a triggering event that causes the acoustic communication node to transition out of the reduced power mode.

Yet further embodiments of the present disclosure are directed to an energy efficient power management method for a wireless network. Wireless communication nodes are arranged in a network and are interconnected by a wireless communication medium. The wireless communication nodes are powered by respective batteries. The wireless communication nodes operate in an active mode in which the wireless communication nodes send and receive wireless messages on the wireless communication medium. In accordance with the method, at least one of the wireless communication nodes transitions to a duty cycle acquisition mode in which power consumed from the respective battery is reduced relative to power consumed in the active mode. While in the duty cycle acquisition mode, the wireless communication node cycles between a standby state and a detection state. The wireless communication node transitions out of the duty cycle acquisition mode to the active mode in response to detection of a triggering event by the wireless communication node while in the detection state.

BRIEF DESCRIPTION OF THE DRAWINGS

Certain embodiments are described with reference to the accompanying drawings, wherein like reference numerals denote like elements. It should be understood, however, that the accompanying drawings illustrate the various implementations described herein and are not meant to limit the scope of various technologies described herein. The drawings show and describe various embodiments of the invention.

FIG. 5 is a timing diagram illustrating an energy efficient protocol that can be implemented in the network of FIG. 1, according to an embodiment.

FIG. 6 is a timing diagram illustrating an energy efficient protocol that can be implemented in the network of FIG. 1, according to an embodiment.

FIG. 7 is a timing diagram illustrating an adaptive energy efficient protocol that can be implemented in the network of FIG. 1, according to an embodiment.

DETAILED DESCRIPTION

Figure 1:
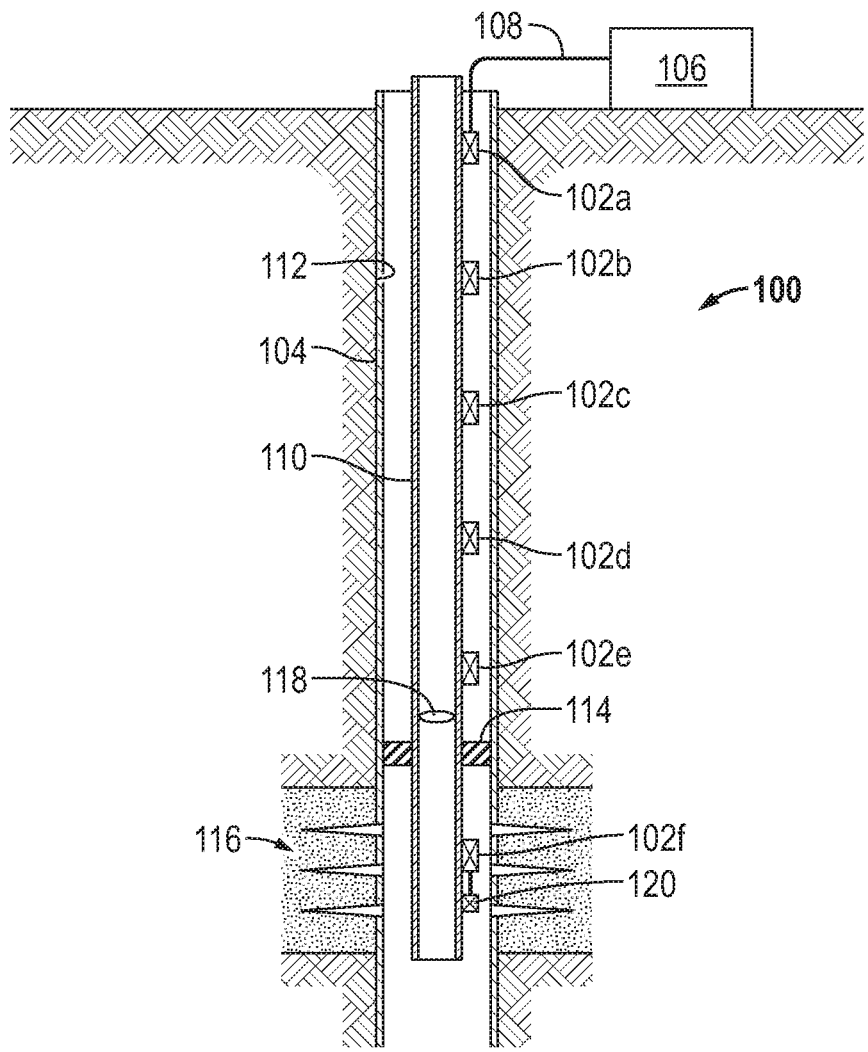
FIG. 1 is a schematic representation of an example of a well system that includes an acoustic communications network, according to an embodiment.

In the following description, numerous details are set forth to provide an understanding of the present invention. However, it will be understood by those skilled in the art that the present invention may be practiced without these details and that numerous variations or modifications from the described embodiments may be possible.

In the specification and appended claims: the terms "connect", "connection", "connected", "in connection with", and "connecting" are used to mean "in direct connection with" or "in connection with via one or more elements"; and the term "set" is used to mean "one element" or "more than one element". Further, the terms "couple", "coupling", "coupled", "coupled together", and "coupled with" are used to mean "directly coupled together" or "coupled together via one or more elements". As used herein, the terms "up" and "down", "upper" and "lower", "upwardly" and "downwardly", "upstream" and "downstream"; "above" and "below"; and other like terms indicating relative positions above or below a given point or element are used in this description to more clearly describe some embodiments of the invention.

Communication systems for transmitting information between the surface and downhole components in a well are faced with numerous challenges, some of which can be addressed by implementing a wireless communication system. One type of wireless communication system that can be deployed in a downhole environment is an acoustic communications system that uses an elastic medium as the communications path. The acoustic communication system can be used in multiple contexts, including testing, drilling or production operations, and can be used to transmit various types of information, such as telemetry information related to downhole measurements, tool status, actuation commands, etc. Generally, an acoustic communication system is considered for use when there is no apparent way to run a wired communications path between the communicating devices. The communicating devices may involve an operational team, where a computer (or control system) is used in the vicinity of the well (e.g., on a rig, waveglider, etc.) or at a remote location that is indirectly connected to a communication module connected to the acoustic network. In other implementations, the acoustic communication network operates autonomously between the various oil and gas equipment.

In general, an acoustic communications network is composed of an arrangement of communication nodes in the form of acoustic modems that receive and transmit messages. The acoustic modems use a pipe string (or tubing) as the elastic transmission medium. The communication network is established by connecting a plurality of acoustic modems to tubing at axially spaced locations along the string. Each modem includes a transducer that can convert an electrical signal to an acoustic signal (or message) that is then communicated using the tubing as the transmission medium. An acoustic modem within range of a transmitting modem receives the acoustic message and processes it, including by demodulating and decoding the message. An example of an acoustic communication network 100 is shown schematically in FIG. 1.

Referring to FIG. 1, a network 100 of communication nodes (e.g., acoustic modems) 102a-f is deployed in a wellbore 104 so that communications can be exchanged between a surface control and telemetry system 106 and downhole equipment along both a downlink (from the surface to the downhole equipment) and an uplink (from the downhole equipment to the surface). The surface control and telemetry system 106 can include processing electronics, a memory or storage device and transceiver electronics to transmit and receive messages to and from the network 100 via a wired connection 108.

In various embodiments, the processing electronics can include a signal conditioner, filter, analog-to-digital converter, microcontroller, programmable gate array, etc. The memory or storage device can store telemetry data received from the downhole equipment so that it can be processed and analyzed at a later time. Yet further, the memory or storage device can store instructions of software for execution by the processing electronics to generate messages to control and monitor performance of a downhole operation. Still further, the memory or storage device can store instructions of software for execution by the processing electronics to initialize the network configuration and automatically update, modify or otherwise adapt the configuration as needed to enable communications and/or to more efficiently and reliably communicate messages between the surface and the downhole components. Yet further, the memory or storage device can store instructions of software and various parameters for execution by the processing electronics to implement a protocol for efficiently managing the use of energy in the network, as will be described in detail below.

The modems 102a-f are acoustically coupled to an elastic medium, such as tubing 110, which can be a jointed pipe string, production tubing or a drillstring, that provides the acoustic communications path. It should be understood, however, that the elastic medium can be provided by other structures, such as a tubular casing 112 that is present in the wellbore 104.

In addition to the modems 102a-f, the installation shown in FIG. 1 includes a packer 114 positioned on the tubing 110 at a region of interest 116. Various pieces of downhole equipment for testing and the like are connected to the tubing 110, either above or below the packer 114, such as a test valve 118 above the packer and a sensor 120 below the packer 114.

Two types of communication nodes generally are deployed in the acoustic network 100. The first type is a modem that is connected to an external tool (e.g., test valve 118 or sensor 120) at a fixed depth. This type of communication node is referred to as an "interfaced modem" ("IM"). Modem 102f is an example of an interfaced modem. The second type is a modem that is used to repeat (or forward), as well as to amplify (or boost), an acoustic message. This second type of communication node is referred to as a "repeater modem" ("RM"). Modems 102b-e are examples of repeater modems.

The repeater modems are used to account for the fact that wireless communication signals between surface systems and devices located furthest from the surface generally lack the strength to reach their destination. In many downhole applications, acoustic signals can experience an attenuation of about 10 decibels/1000 feet. Accordingly, when acoustic noise is present in the environment, it can be substantial relative to the strength of the acoustic signal. Hence, the repeater modems can repeat and amplify messages exchanged between a surface control and telemetry system and sensors or tools that interface with interfaced modems.

Figure 2:
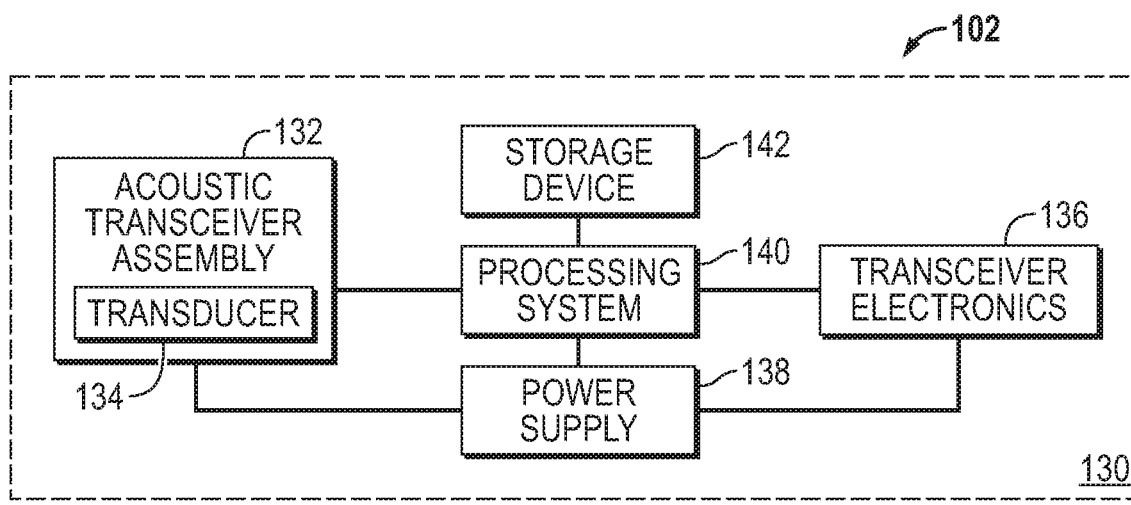
FIG. 2 is a schematic representation of an example of an acoustic modem that can be deployed in the acoustic communications network of FIG. 1, according to an embodiment.

A schematic illustration of a modem 102, which can be either an interfaced modem or a repeater modem, is illustrated in FIG. 2. Modem 102 includes a housing 130 that supports an acoustic transceiver assembly 132 that includes electronics and a transducer 134 which can be driven to create an acoustic signal in the tubing 110 and/or excited by an acoustic signal received from the tubing 110 to generate an electrical signal. The transducer 134 can include, for example, a piezoelectric stack, a magneto restrictive element, and/or an accelerometer or any other element or combination of elements that are suitable for converting an acoustic signal to an electrical signal and/or converting an electrical signal to an acoustic signal. The modem 102 also includes transceiver electronics 136 for transmitting and receiving electrical signals. Power can be provided by a power supply 138, such as a lithium battery, although other types of power supplies are possible, including supply of power from a source external to the modem 102.

The transceiver electronics 136 are arranged to receive an electrical signal from and transmit an electrical signal to the downhole equipment, such as the sensor 120 and the valve 118. The electrical signal can be in the form of a digital signal that is provided to a processing system 140, which can encode and modulate the signal, amplify the signal as needed, and transmit the encoded, modulated, and amplified signal to the transceiver assembly 132. The transceiver assembly 132 generates a corresponding acoustic signal for transmission via the tubing 110.

The transceiver assembly 132 of the modem 102 also is configured to receive an acoustic signal transmitted along the tubing 110, such as by another modem 102. The transceiver assembly 132 converts the acoustic signal into an electric signal. The electric signal then can be passed on to processing system 140, which processes it for transmission as a digital signal to the downhole equipment. In various embodiments, the processing system 140 can include a signal conditioner, filter, analog-to-digital converter, demodulator, modulator, amplifier, encoder, decoder, microcontroller, programmable gate array, etc. The modem 102 also can include a memory or storage device 142 to store data received from the downhole sensors or other equipment so that the data can be transmitted or retrieved from the modem 102 at a later time. Yet further, the memory or storage device 142 can store instructions of software for execution by the processing system 140 to perform the various modulation, demodulation, encoding, decoding, etc. processes described above, network configuration and discovery information, and energy management protocols that will be described below.

Returning again to FIG. 1, to account for SNR limitations, communications between the surface and a downhole component often are performed as a series of hops (or communication links). This is accomplished by positioning RMs at axially spaced intervals (e.g., 1000 ft.) along the acoustic communications path (e.g., a tubing) so that the RMs can forward acoustic messages from the surface to the final IM node or from an IM node to the surface. Because a communication system is designed to operate reliably in different types of noise conditions, the spacing between RMs often is configured to account for the worst case noise scenario. Network discovery protocols and configuration information also will take into account the noise scenario in establishing routing through the network. In some cases, the routing information can include designation of certain of the RMs as modems that are critical to a routing path in order to maintain the integrity of communications on the network.

Figure 3:
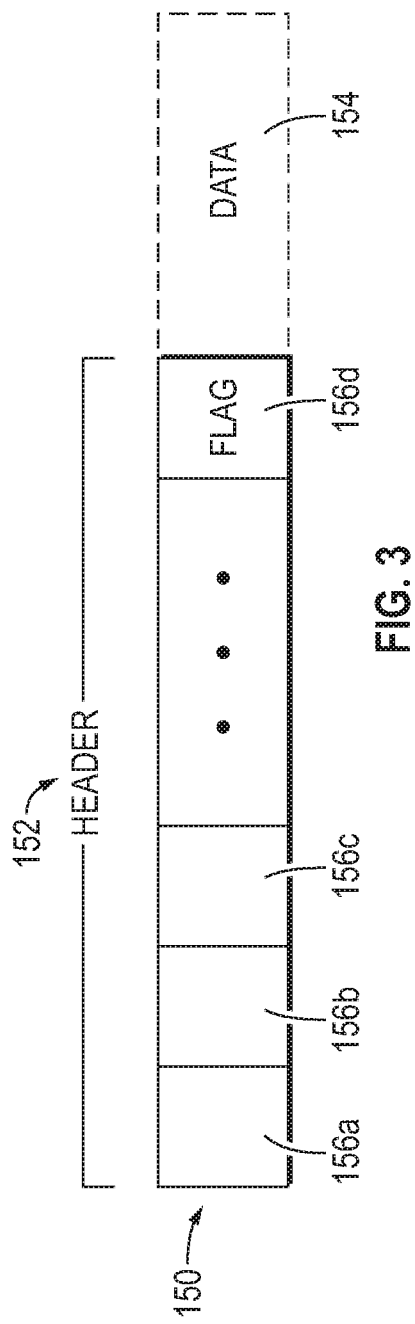
FIG. 3 is a schematic representation of a wireless message frame that can be transmitted in the network of FIG. 1, according to an embodiment.

Acoustic messages exchanged between the surface and the downhole modems or nodes are transmitted in wireless frames. An example of a wireless frame 150 is shown in FIG. 3. The frame 150 can include a header portion 152 and, in some instances, a data portion 154. The header portion 152 can include fields 156 that carry various types of information for use by the nodes 102, such as a preamble field 156a, a source address field 156b, a destination address field 156c, and so on. In embodiments, the frame 150 can include one or more fields 156d in which a flag can be set or other data provided to alert a node 102 of certain information or conditions and/or to cause the node 102 to take certain actions, as will be described further below.

Because the communication system is wireless, the efficient use of energy for powering the nodes so that they can send, receive and/or act on messages carried in a frame 150 can present additional challenges. Accordingly, embodiments disclosed herein are directed to an energy efficient protocol that can be implemented in the wireless communication network in order to efficiently manage each node's consumption of power from its power source 138 (e.g., battery) and thereby extend the useful life of the network. In addition, in applications in which the modems can be transported and re-deployed in a different network, the modems can be configured so that they automatically transition to a power saving mode of operation during transport or when otherwise not in use.

In accordance with the energy efficient protocol described herein, nodes 102 in the communication network can be configured to transition from an active mode of operation to a reduced power mode of operation referred to as a duty cycle acquisition mode ("DCAM"). Moving from the active mode to DCAM can be triggered by any of a variety of transition conditions, such as the time elapsed since the last activity (e.g., receipt or transmission of a message), detection of an event or pattern of events (e.g., a high noise level that would impede communications on the network, a pressure or temperature event indicating that network communications can be reduced), or receipt of an explicit message instructing the modem to move to DCAM.

When in the duty cycle acquisition mode, the nodes 102 cycle between a detection state (in which the nodes 102 can detect certain predefined events) and a standby state. In general, when in the standby state, the functionality of the node 102 is reduced so that the standby state is a lower power consumption state than the detection state. For example, the functionality of the node 102 can be limited so that the node 102 cannot send or receive messages on the wireless medium 110 or communicate with interfaced tools or sensors. As another example, the functionality of the node 102 may be limited so that the node 102 can detect certain types of events, but not others. As yet another example, the functional features of the node 102 that are enabled when in the standby state can be varied depending on the current network conditions, the energy conservation goals, or the operating parameters of the DCAM.

In general, the energy efficient protocol is implemented so that the nodes 102 remain in the standby state to conserve energy and then switch to the detection state to detect whether a triggering event has occurred. A triggering event is an event that informs the node (or modem) 102 that it should transition out of the duty cycle acquisition mode and into an active mode in which the node 102 is fully operational, e.g., the node 102 can send and receive messages and, in the case of an interfaced modem 102, communicate with interfaced tools and sensors. The triggering event can be wireless activity on the network, a flag in a wireless message frame, telemetry data acquired from a sensor 120, or any other event that has been defined as a triggering event. For example, the triggering event can also be a detected noise level that indicates the acoustic noise level is sufficiently low for reliable communications so that the modem 102 can transition out of the DCAM to the active mode. In embodiments, the noise level can be a particularly useful trigger event in situations where the modem 102 had previously transitioned from the active mode to the DCAM based on a noise level that was impeding reliable communications. If a triggering event is not detected, the modem 102 remains in the reduced power duty cycle acquisition mode or can be forced to transition to the active mode upon expiration of a timer. In embodiments, the energy efficient protocol can be an adaptive protocol, as will be described in further detail below.

The DCAM includes a detection time period during which the modem 102 is in the detection state and a standby time period during which the modem 102 is in the standby state. The duty cycle of the DCAM (i.e., the ratio of the detection period to the sum of the detection period and standby period) has a direct relationship with energy efficiency. More energy savings can be achieved the longer the modem 102 is in the standby state relative to the detection state. Switching to the detection state enables the modem 102 to periodically check whether the modem 102 should transition to the fully active mode. Duty cycling between standby and detection states thus also provides for time savings in the network relative to protocols in which modems are simply left in a hibernation or inactive mode for an extended time with no ability to detect and respond to an event indicating that the modem should wake up. In embodiments, the duty cycle of the DCAM can be a fixed ratio or can be varied over time, such as increased or decreased in a linear manner, a stepped manner, or in an adaptive manner.

Figure 4:
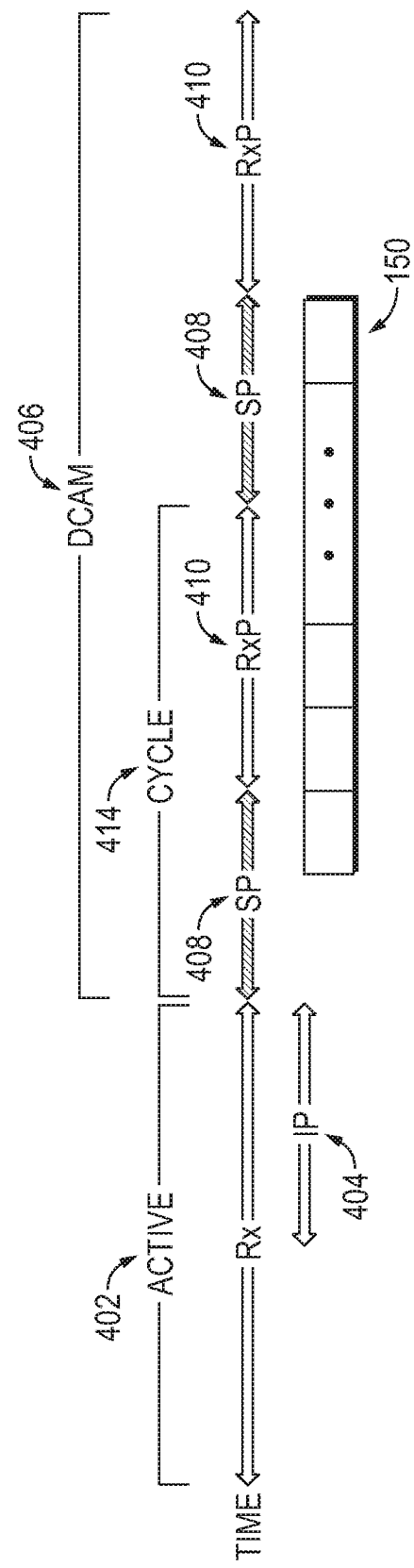
FIG. 4 is a timing diagram illustrating an energy efficient protocol that can be implemented in the network of FIG. 1, according to an embodiment.

FIG. 4 illustrates a timing diagram corresponding to implementation of an energy efficient protocol, in accordance with an embodiment. In this example, a modem (such as interfaced modem 102*f* in FIG. 1) initially is in an active mode (Rx) 402. In the active mode, the modem 102's electronic components are energized so that the modem 102 can send, receive, encode, and decode messages and perform other functions, such as acquire data from or send commands to an interfaced device 118, 120. In the embodiment of FIG. 4, the modem 102 is configured to transition from the active mode (Rx) 402 to the DCAM 406 after an inactivity period (IP) 404 during which no activity has occurred. For example, the modem 102 can implement a timer or counter that is reset each time an activity occurs (e.g., transmission of a message, receipt of a message, acquisition of data, detection of a condition such as noise, pressure or temperature). If no activity occurs before the timer or counter expires, then the modem 102 responds by switching to the DCAM 406.

As shown in FIG. 4, the DCAM 406 includes a standby period (SP) 408 and a detection period (RxP) 410. During SP 408, modem 102 is in the lower power standby state. During RxP 410, modem 102 is in a detection state in which the modem is sufficiently powered so that it can at least detect a triggering event 412. In general, the detection state is a higher power state than the standby state. In embodiments, the modem 102 can have the same functionality in the standby state that it has in the active mode of operation, or the modem 102 can have less functionality than when in the active mode. If a triggering event 412 is not detected during RxP 410, the modem 102 will remain in the DCAM 406 and continue to cycle between standby and detection states. If a triggering event 412 is detected during the RxP time period 410 (as shown in FIG. 5), the modem 102 transitions out of the DCAM 406 to the active mode Rx 402.

Triggering event 412 can be any type of predefined event that causes the modem 102 to transition out of the DCAM 406. In embodiments, the triggering event 412 can be detection of a message on the wireless communications medium 110. As an example, and as shown in FIG. 4, triggering event 412 can be a wakeup flag embedded in field 156*d* of a specific message frame 150 transmitted on the acoustic transmission medium 110 from another modem 102. Upon detection during the RxP period 410 of a frame 150 with a wakeup flag, the receiving modem 102 responds by transitioning out of the DCAM 406 and to the active mode in which the modem 102 is fully operational. As shown in FIG. 4, to ensure that the modem 102 can detect the message frame 150, the size of one DCAM cycle 414 (i.e., the sum of one SP 408 and one RxP 410) is set so that RxP 410 falls within the size of the frame 150. In other embodiments, a brute force wake up method can be implemented where the DCAM cycle 414 has no relationship to the size of the frame 150. Rather, the wake up signal 412 is transmitted randomly, with the result that the transition to the active mode 402 may take much longer.

As another example, the triggering event 412 can be the detection of acoustic activity on the transmission medium 110 during the RxP period 410. The event of detection (regardless of the type of activity or the particular content of a message) causes the modem 102 to transition out of a DCAM 406 to the active mode 402. Other triggering events 412 can be an acoustic, pressure or temperature event or pattern of events if the modem 102 is equipped with a suitable gauge or sensor.

Yet other types of events 412 can be defined to trigger a modem 102 to transition out of the duty cycle acquisition mode 406. For example, a modem 102 that is interfaced with a sensor 120 can be configured to acquire data from the sensor 120 during the RxP period 412. The sensor 120 can be a pressure gauge, a temperature sensor, an acoustic sensor or any other type of sensor that monitors parameters of interest in the region in which the sensor 120 is deployed. If the data acquired by the modem 102 indicates the occurrence of a triggering event 412, such as a change in the monitored parameter, a parameter that has exceeded a predefined threshold value or a predefined pattern in the monitored parameter, then the modem 102 responds by transitioning out of the duty cycle acquisition mode 406.

In embodiments, the DCAM 406 can be time bounded so that, if a triggering event 412 is not detected, the modem 102 transitions out of DCAM 406 upon expiration of a timer or counter.

As with the transition out of the duty cycle acquisition mode 406, the transition into the duty cycle acquisition mode 406 also can be implemented in a variety of manners and in response to a variety of types of events. The example of FIG. 4 is illustrative of a transition to DCAM 406 after a period of inactivity. As another example, with reference to the timing diagram of FIG. 6, the modem 102 is configured to transition from the active mode (Rx) 402 to DCAM 406 in response to detection of a transition event 418. In this example, rather than a period of inactivity, transition event 418 can be receipt of a message frame 150, a pattern in data acquired from sensors 120, or a high noise level that would impede reliable wireless communications. It should be understood, however, that the transition event 418 can be any predefined event to which the modem 102 responds by transitioning the DCAM 406.

In embodiments, the energy efficient protocol can be implemented in an adaptive manner according to which the parameters of the duty cycle acquisition mode are modified in response to current operating conditions. For example, and with reference to the timing diagram of FIG. 7, an initial IP 422 within an active mode 420, and SP1 and RxP periods 424 and 426 within an adaptive duty cycle acquisition mode 428 are defined, where IP period 422 is of relatively short duration (e.g., 10 minutes). In this example, the timing parameters for SP1 424 and RxP 424 within the duty cycle acquisition mode 428 are initially defined so that the SP1 period 424 is set at the minimum duration it will have while in the duty cycle acquisition mode 428, with the minimum duration being sufficient to accommodate any time constraint needed for the modem 102 to switch from the standby state to the detection state. Over time, the SP period can be increased, while the RxP period is held constant, thus providing for an increasingly smaller ratio of RxP/SP to achieve enhanced power efficiency. In general, the length of the RxP period is based on the time needed to detect a triggering event 412. For example, if the triggering event 412 is receipt of a wireless message, then the length "t1" of the RxP period is based on the size of the wireless frame 150. If the triggering event 412 is detection of wireless activity, then the length "t2" of the RxP period can be shorter in order to optimize the energy efficiency of the DCAM. Yet further, if the triggering event 412 is a pattern of acquired sensor data, then the length "t3" of the RxP period can be shorter yet.

In the example of FIG. 7, the ratio RxP/SP is initially set to approximately "1", where the duration of the RxP and SP1 periods 424 and 426 are substantially equal. The ratio RxP/SP can then be modified over time and/or in response to operational conditions and/or in response to information sent to the modem 102 where power savings is of increased importance. For example, as shown in FIG. 7, once the modem 102 has been in the adaptive duty cycle acquisition mode 428 for a predefined period of time without detecting a triggering event 412, the SP parameter is increased while the RxP parameter is held constant so that the ratio RxP/SP is changed to "0.5", where the modem 102 remains in standby in an SP2 time period 430 for twice as long as it is in the RxP period 426. The ratio can then be further modified, such as in a single step or in multiple fixed steps, until the ratio eventually approaches "0", where the modem 102 is in an SP3 time period 432 for a significantly longer time than the RxP period 426. In embodiments, the duty cycle can be changed linearly over time, in steps of various sizes over time, increased and then decreased, or in any other manner that is suited for the application in which the wireless communication system is implemented.

As an example, the adaptive duty cycle acquisition mode 428 can be particularly useful in networks in which telemetry data is acquired periodically from downhole sensors. In such systems, allowing the modems 102 to cycle between standby and detection states between telemetry data acquisition periods instead of placing the modems 102 into an inactive mode for an extended period can provide considerable time savings in addition to power savings.

Parameters other than or in addition to RxP, SP and RxP/SP can be defined for the DCAM. For example, the functions or features of the modem 102 that are enabled/disabled when in the standby state can be defined or modified based on the particular application in which the system is used, the current operating conditions, the current RxP/SP ratio, or any other consideration for power savings.

Further variations on the energy efficient protocol and adaptive duty cycling are envisioned. For example, a modem 102 can be forced into the adaptive duty cycling acquisition mode 428 based on information embedded in a message frame 150 on the communications medium 110. In embodiments in which the network is deployed in a wellbore 104, a particular duty cycling acquisition mode 428 and its corresponding parameters can be predefined for each particular operational phase performed in the wellbore 104. Identification of the operational phase can be indicated by a flag embedded in the wireless frames 150 (e.g., in a field 156d), which then forces the modem 102 to implement adaptive duty cycling in accordance with the parameters that have predefined for that phase, such as the duration of the inactive period before transitioning to the duty cycle acquisition mode, the durations of the RxP and SP time periods, the RxP/SP ratio, how that ratio should be varied over time (if at all), the features of the modem 102 that should be disabled during the SP period, and the triggering event(s) that will cause the modem to transition out of or into the duty cycle acquisition mode.

In embodiments, the duty cycle acquisition mode parameters can be defined by implementing an algorithm that automatically predicts optimal parameters based on current operating conditions. For example, a modem 102 can calculate the time it is being used during a particular operation, such as by counting the number of messages the modem receives over a period of time (e.g., during a data acquisition cycle). Knowledge of the time in use can then be employed to define an optimal RxP/SP ratio, as an example.

In embodiments, the duty cycle acquisition mode parameters can be defined based on the type of downhole tool that is connected in the workstring. For example, the modem 102 can receive a wireless message containing information that notifies the modem 102 to implement a particular DCAM mode that corresponds to the type of tool currently in use. For operations in which the downhole tool is used infrequently or just when needed, the RxP/SP ratio can be low. Further, not all of the modems 102 in the network may implement the same DCAM parameters. For example, modems 102 that are used primarily in a communication session in conjunction with infrequently used tools can have a lower RxP/SP ratio than the other modems 102 in the network that participate in other types of operations. Defining a low RxP/SP ratio for infrequently used modems 102 in addition to defining the particular triggering event(s) 412 that will transition such modems 102 out of the duty cycle acquisition mode can greatly enhance energy conservation.

In embodiments, knowledge of the DCAM parameters enables monitoring of battery usage and determination of a battery's remaining useful life. Thus, for example, in applications in which the acoustic network is used for a one-shot operation in a wellbore, the modems 102 can be pulled from the wellbore upon completion of the operation and then re-deployed and re-used in another operation without replacing the battery. In addition, a modem's position in the communication routing paths of the network can influence the amount of energy used. Thus, knowledge of the battery's remaining life can assist with positioning a modem in a new routing path when it is re-deployed.

The energy efficient protocols described above can be used in conjunction with other network algorithms in order to further enhance efficiency. As an example, networks in which network discovery and routing algorithms are implemented can also implement a protocol where the duty cycle parameters for modems 102 which are heavily involved in network discovery and routing decisions are different than the parameters for modems that participate less in discovery and routing. In addition, network routing information, such as whether a modem 102 is deemed a critical modem in a routing path, can be used to define the duty cycle parameters for that modem 102. For example, a critical modem 102 may have a high RxP/SP ratio to ensure that the modem 102 is readily and quickly available to respond to messages on the network in order to ensure network integrity.

As yet another example, a modem 102 can be configured to detect if it is being over-used in the routing. If the modem 102 determines that it is being over-used (e.g., based on receipt of a large number of messages), the modem 102 can transition to the DCAM in order to avoid a failure. In such an event, the modem 102 informs other modems 102 in the network of the decision to transition to the DCAM. If the other modems 102 know which modems are in the DCAM, the other modems 102 can send wake up messages, if needed. For example, a first modem 102 can send a wake up message to a second modem 102 if the first modem 102 detects a pattern of acquired data indicating that the second modem 102 will be needed in the routing path. Or the first modem 102 can send a wake message to the second modem 102 if the first modem 102 detects an improvement in the acoustic noise level indicating that communications can be reliably resumed.

Figure 8:
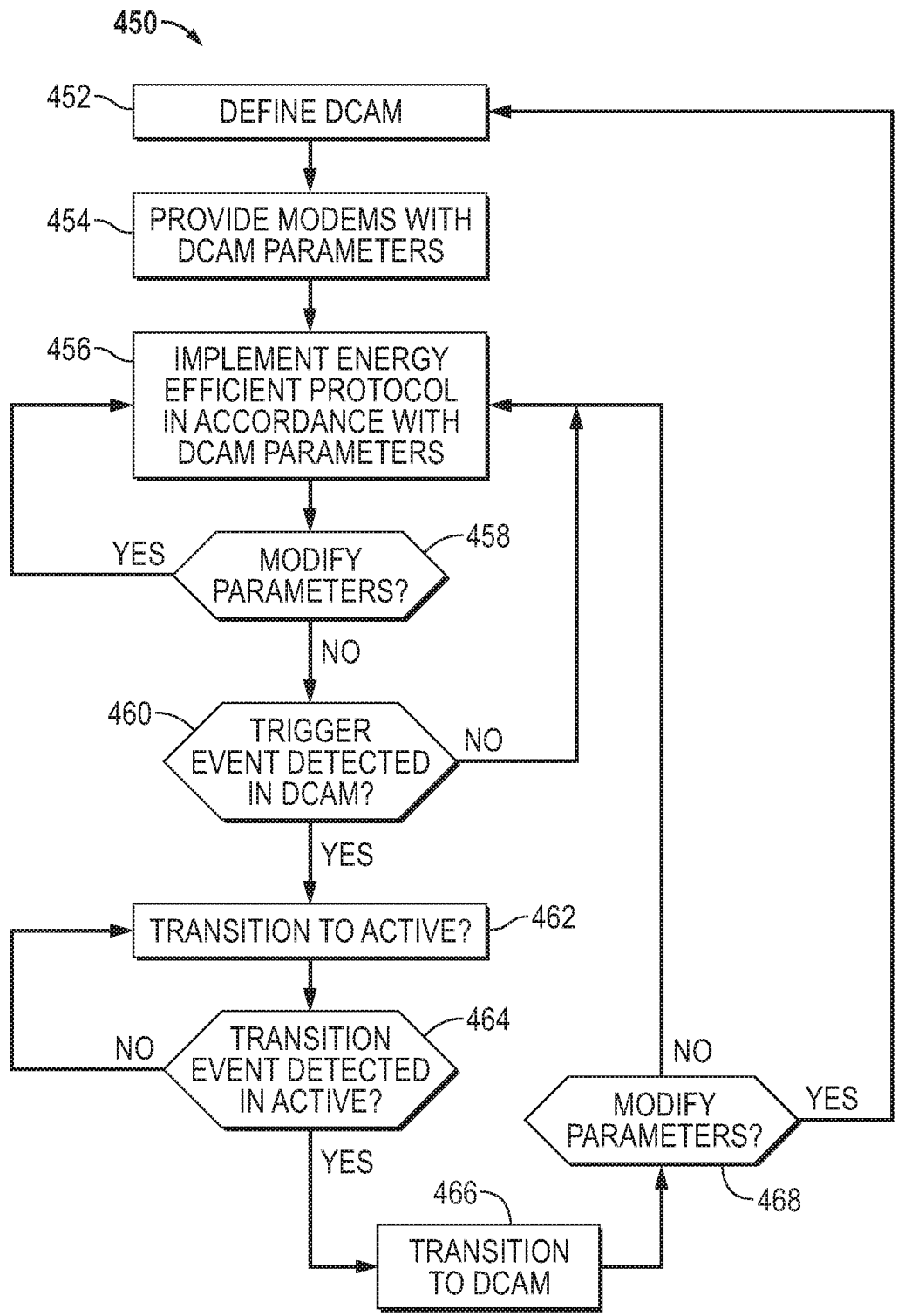
FIG. 8 is a diagram of a workflow for implementing an adaptive energy efficient protocol, according to an embodiment.

FIG. 8 illustrates a diagram of a workflow 450 for implementing an energy efficient protocol with a duty cycle acquisition mode. At block 452, parameters of the energy efficient protocol, including the parameters of a duty cycle acquisition mode are defined. At block 454, parameters are provided to the modems 102. For example, the parameters can either be stored in memory 142 in each of the modems 102 prior to installation in the network or can be transmitted to the modems 102 in messages 150 carried on the communications medium 110 after the modems 102 are deployed. At block 456, the modems 102 implement the energy efficient protocol in accordance with the defined parameters, including transitioning to the duty cycle acquisition mode. At block 458, the modem 102 determines whether the duty cycle parameters should be modified. The parameters can be modified in accordance with a predefined protocol, in response to a message 150 received on the communication medium 110, and/or in response to a detected event 412 or pattern of events (e.g., an acoustic event, pressure event, temperature event). At block 460, if a triggering event 412 is detected during the RxP period of the duty cycle acquisition mode, the modem 102 transitions out of the duty cycle acquisition mode and to the active mode (block 462). Otherwise, the modem 102 remains in the duty cycle acquisition mode and switches between standby and detection states in accordance with the current DCAM parameters. The modems 102 remains in the active mode until a transition event is detected (block 464). In response to the transition event, the modem 102 transitions to the DCAM (block 466). If the DCAM parameters should be modified (block 468), the workflow returns to block 452 for the new parameters. Otherwise, the modem 102 implements the DCAM in accordance with the previous parameters (block 456). Although the workflow 450 has been described in FIG. 8 with reference to the modem 102 starting in the duty cycle acquisition mode, it should be understood that the workflow 450 could begin at block 462 where the modem 102 is in the active mode.

It should be further understood that the techniques described herein can be implemented in a variety of wireless communications systems, and that the physical layer of the communication is not limited to the acoustic telemetry system that has been described above. Further, single or multi-carrier modulation systems can be used in any wireless communication system. As an example, orthogonal frequency division multiplexing (OFDM) is a modulation technique that is suitable for frequency selective channels. However, embodiments disclosed herein are not limited to the use of any particular type of modulation system.

While the present disclosure has been disclosed with respect to a limited number of embodiments, those skilled in the art, having the benefit of this disclosure, will appreciate numerous modifications and variations there from. It is intended that the appended claims cover such modifications and variations as fall within the true spirit and scope of the invention.

What is claimed is:

1. A method for managing energy efficiency in a network of wireless communication nodes interconnected by a wireless communications medium, comprising:
deploying a plurality of wireless communication nodes interconnected in a communication network by a wireless communication medium, each of the wireless communication nodes operable in at least an active mode for sending and receiving messages on the wireless communication medium and in a reduced power mode, each of the wireless communication nodes including a wireless power source;
transitioning operation of at least one of the wireless communication nodes into the reduced power mode, wherein operation of the wireless communication node in the reduced power mode cycles between a first time period and a second time period, wherein energy consumed from the wireless power source is less during the first time period than in the second time period, and wherein the wireless communication node is operable to detect a triggering event during the second time period but not the first time period, wherein the triggering event is overuse of at least one of the wireless communication nodes; and
transitioning operation of the wireless communication node out of the reduced power mode in response to detecting the triggering event during the second time period, wherein the triggering event is one of a message embedded in a message frame sized in relation to the second time period, a message directed to a selected node, or an event that is not a wakeup message.

2. The method as recited in claim 1, wherein transitioning operation into the reduced power mode comprises transitioning in response to elapse of a predefined period of inactivity.

3. The method as recited in claim 1, wherein transitioning operation into the reduced power mode comprises transitioning in response to a predefined level of acoustic noise.

4. The method as recited in claim 1, wherein the triggering event is wireless activity on the wireless communication medium.

5. The method as recited in claim 1, further comprising, while operating in the reduced power mode, increasing duration of the first time period relative to the second time period.

6. The method as recited in claim 1, further comprising:
determining an operational phase of the communication network; and
modifying parameters of the reduced power mode based on the determined operational phase.

7. The method as recited in claim 6, wherein the modified parameters include a ratio of the first time period to the second time period.

8. The method as recited in claim 1, further comprising deploying the network in a wellbore that penetrates a hydrocarbon-bearing formation.

9. An acoustic communication system, comprising:

a plurality of acoustic communication nodes arranged in a network in which the acoustic communication nodes are interconnected via a plurality of acoustic communication links, wherein each of the acoustic communication nodes receives power from a wireless power source;

wherein, in response to occurrence of a predefined event, a first acoustic communication node transitions to a reduced power mode of operation in which the first acoustic communication node cycles between a standby state and a detection state, wherein the first acoustic communication node consumes less power from the wireless power source in the standby state than in the detection state, wherein, when in the detection state but not in the standby state, the first acoustic communication node is operable to detect a triggering event that causes the first acoustic communication node to transition out of the reduced power mode, and wherein the triggering event is overuse of at least one of the acoustic communication nodes.

10. The acoustic communication system as recited in claim 9, wherein the acoustic communication nodes are coupled to an elastic communications medium that is deployed in a wellbore, wherein the wellbore is a hydrocarbon well, and wherein at least one of the acoustic communication nodes is coupled to a downhole wireless sensor.

11. The acoustic communication system as recited in claim 10, wherein parameters of the reduced power mode are modified based on current operating conditions in the wellbore.

12. The acoustic communication system as recited in claim 11, wherein the parameters of the reduced power mode that are modified include a ratio of duration of the standby state to duration of the detection state.

13. An energy efficient power management method for a wireless network, comprising:

arranging a plurality of wireless communication nodes in a network, wherein the wireless communication nodes are interconnected by a wireless communication medium, and wherein each of the wireless communication nodes is powered by a battery;

enabling the wireless communication nodes to operate in an active mode in which the wireless communication nodes send and receive wireless messages on the wireless communication medium;

transitioning at least one of the wireless communication nodes to a duty cycle acquisition mode in which power consumed from the respective battery is reduced relative to power consumed in the active mode, wherein the wireless communication node cycles between a standby state and a detection state while in the duty cycle acquisition mode wherein the transitioning is due to overuse of at least one wireless communication nodes; and transitioning the at least one wireless communication node out of the duty cycle acquisition mode to the active mode in response to detection of a triggering event by the at least one wireless communication node while in the detection state, wherein the triggering event is one of a message embedded in a message frame sized in relation to the second time period, a message directed to a selected node, a pressure event, a temperature event, a time event, or a signal from a sensor.

14. The method as recited in claim 13, further comprising automatically modifying parameters of the duty cycle acquisition mode based on a predefined condition, wherein the modified parameters include a ratio between a time period of the detection state and a time period of the standby state.

15. The method as recited in claim 14, wherein the predefined condition is a time period during which a triggering event is not detected.

* * * * *